US006879489B2

(12) United States Patent
Koertzen

(10) Patent No.: US 6,879,489 B2
(45) Date of Patent: Apr. 12, 2005

(54) PROCESSOR SENSING VOLTAGE REGULATOR

(75) Inventor: Henry W. Koertzen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 10/359,957

(22) Filed: Feb. 6, 2003

(65) Prior Publication Data

US 2004/0158449 A1 Aug. 12, 2004

(51) Int. Cl.[7] ............................. H05K 7/20; G06F 1/26
(52) U.S. Cl. ...................... 361/704; 361/785; 713/300
(58) Field of Search ............................. 323/282, 283, 323/284, 274; 361/704, 707, 784, 809; 713/300, 301

(56) References Cited

U.S. PATENT DOCUMENTS

| | | | | |
|---|---|---|---|---|
| 5,671,149 A | * | 9/1997 | Brown | 702/64 |
| 5,919,262 A | * | 7/1999 | Kikinis et al. | 713/300 |
| 6,359,783 B1 | * | 3/2002 | Noble | 361/704 |

* cited by examiner

*Primary Examiner*—Rajnikant B. Patel
(74) *Attorney, Agent, or Firm*—Carrie A. Boone, P.C.

(57) ABSTRACT

A system in which a voltage regulator controls the die voltage rather than the socket voltage of a microprocessor is disclosed. The voltage regulator's response time is decreased due to the larger transient of the die voltage, relative to the socket voltage. The variation in socket resistance is no longer a factor affecting voltage and power loss margins. The system is implemented with minimal cost, as the die voltage is already available for use during testing.

7 Claims, 4 Drawing Sheets

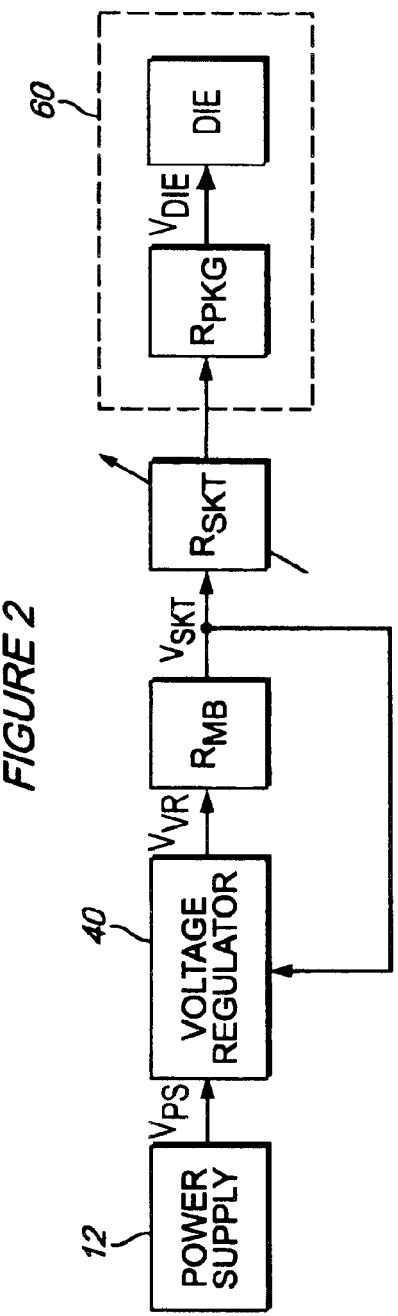
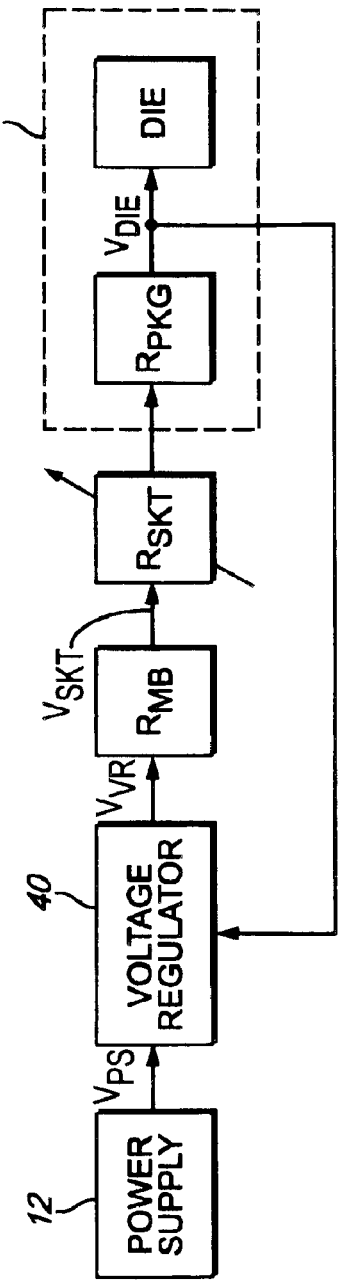
FIGURE 2
FIGURE 3

PROCESSOR SENSING VOLTAGE REGULATOR

FIELD OF THE INVENTION

This invention relates to CPU voltage regulators and, more particularly, to feedback sensing operations of the voltage regulator.

BACKGROUND OF THE INVENTION

A voltage regulator is a switching power supply that supplies a steady, typically low, voltage to a load. Central processing unit (CPU) voltage regulators receive one voltage and supply a second voltage to a processor, also known as a microprocessor. A CPU voltage regulator may, for example, supply 1–2 volts to the microprocessor from a 12-volt input.

When the load current suddenly increases, such as when the processor state changes from idle to active, the voltage supplied to the processor is drawn down, known as a voltage transient or voltage droop. Likewise, a voltage spike may occur when the processor state changes from active to idle. The voltage regulator is designed to minimize the effects of voltage droop and voltage spike, either of which can damage the load, by reacting as quickly as possible to the change in load condition.

By coupling the load voltage to the voltage regulator as a feedback loop, the load condition can be monitored. The feedback enables the voltage regulator to quickly react to a voltage transient, such as when the current drawn by the load increases suddenly. For example, the load current to a microprocessor increases when the microprocessor changes from idle to active.

For a microprocessor load, the voltage of the socket pins on the motherboard in which the microprocessor is seated is fed back into the voltage regulator. This is known as socket sensing. The socket is a convenient monitoring point for the voltage regulator. However, the socket voltage, $V_{skt}$, is not the same as the die voltage, $V_{die}$, due to resistances in the socket and the microprocessor packaging. Furthermore, the resistance of the socket changes over its lifetime, which makes the difference between $V_{skt}$ and $V_{die}$ difficult to precisely ascertain. Socket sensing is thus limited as a mechanism for minimizing voltage droop.

Thus, there is a need for a voltage regulator that overcomes the shortcomings of the prior art.

BRIEF DESCRIPTION OF THE DRAWINGS

FIG. 2 is a block diagram of a voltage regulator that performs socket sensing according to the prior art;

FIG. 3 is a block diagram of a voltage regulator that performs die sensing according to some embodiments of the invention;

DETAILED DESCRIPTION

In accordance with some embodiments described herein, a system for regulating the voltage supplied to a semiconductor device, such as a microprocessor, is disclosed. The system includes a voltage regulator that controls the die voltage rather than the socket voltage of the semiconductor. Because the die voltage produces a larger transient than the socket voltage, the voltage regulator responds more quickly to a sudden load change. The variation in socket resistance no longer impairs the determination of the load voltage by the voltage regulator, since the voltage regulator measures the load voltage directly at the die.

Because the die voltage is already available for testing purposes, the system can be implemented with minimal additional cost. More cost-effective thermal solutions and increased microprocessor operating voltages are among the benefits that may be derived using the system.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. For example, although the voltage regulator is controlling the voltage into a microprocessor in the described embodiments, other semiconductor devices may benefit from the principles described herein. The following detailed description is, therefore, not to be construed in a limiting sense, as the scope of the present invention is defined by the claims.

Figure 1:
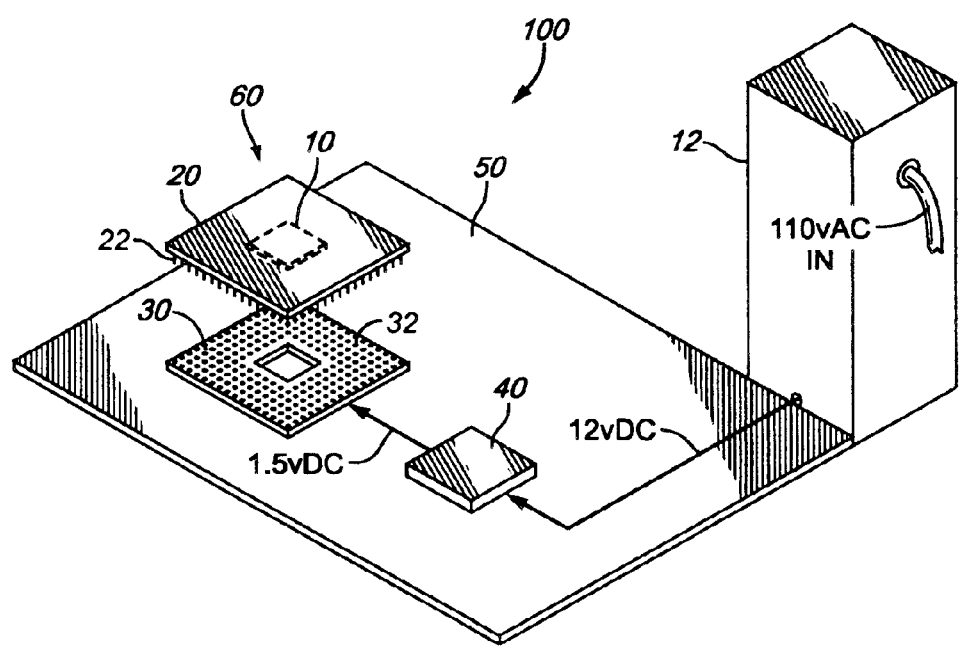
FIG. 1 is a perspective view of a system according to some embodiments of the invention.

In FIG. 1, a perspective view of a system 100 is depicted, according to some embodiments. The system includes a motherboard 50, a printed circuit board for electrically coupling integrated circuits (ICs) as well as discrete electrical components, such as resistors, capacitors, and inductors. The motherboard 50 may be the system board for a microprocessor-based system, such as a desktop computer, for example.

The system 100 houses a microprocessor 60, also known as a central processing unit (CPU), comprising a die 10 and a package 20 including pins 22, for fitting into a socket 30. The socket 30 is affixed to the motherboard 50. The die 10 is typically made from a silicon material, and includes a collection of transistors, which comprise the functional circuitry of the microprocessor 60. The package 20 may be a printed circuit board that is soldered or otherwise affixed to the die 10. The package 20 includes pins 22 for mating with receiving pins 32 within the socket 30, for connecting the microprocessor 60 to the motherboard 50. Once the microprocessor 60 is inserted into the socket 30, electrical connection to other circuitry on the motherboard 50 is possible.

Also shown in FIG. 1 is a voltage regulator module 40, or voltage regulator. The voltage regulator 40 controls, as nearly as possible, the voltage that is received by the microprocessor 60. Generally, the voltage regulator is located in close proximity to the microprocessor. While the voltage regulator 40 is affixed to the motherboard 50 in FIG. 1, it may alternatively be connected thereto by a plug-in board or module.

The voltage regulator 40 is supplied with a voltage, usually 12 volts of direct current (12V DC), from a power supply 12, which is connected to an alternating current (AC) source. The power supply 12 converts 110 V AC from the source, which may be a wall outlet, for example, into the 12 V DC. The voltage regulator 40 further scales the voltage down to a voltage desired by the load, such as 1.5 V DC for the microprocessor 60.

When a voltage is supplied to the microprocessor 60, current flows through the vast array of transistors within the die 10. It is thus the voltage at the die, or die voltage, $V_{die}$, that the voltage regulator 40 ultimately controls. However, prior art systems have conveniently sensed the socket voltage, $V_{skt}$, to regulate the voltage to the microprocessor 60. Feedback input pins to the voltage regulator's controller IC are connected to the motherboard power planes at the socket 30.

The implications of socket sensing are illustrated in the block diagram of FIG. 2. The voltage regulator 40 receives a voltage, $V_{ps}$, from the power supply 12, and supplies a voltage, $V_{vr}$, to the microprocessor 60 along a first path, a power delivery path. The socket voltage, $V_{skt}$, is fed back into the voltage regulator 40 along a second path, a signal path. The voltage regulator 40 is performing socket-sensing.

The voltage, $V_{vr}$, is affected by various resistances, before being received by the microprocessor 60. Resistance from the motherboard 50, the socket 30, and the package 20 are depicted as $R_{mb}$, $R_{skt}$, and $R_{pkg}$, respectively. According to Ohm's Law, the socket voltage, $V_{skt}$, equals the voltage regulator voltage, $V_{vr}$, minus the motherboard resistance, $R_{mb}$, times the current flowing through the motherboard 50. The output voltage, $V_{vr}$, can thus be readily adjusted using the socket-sensing feedback scheme shown in FIG. 2.

The die voltage, $V_{die}$, is similarly ascertainable using Ohm's Law, this time taking into account the socket ($R_{skt}$) and package ($R_{pkg}$) resistances. However, the socket resistance typically varies by a substantial amount over the lifetime of the socket 30. The diagonal arrow drawn through the socket resistance, $R_{skt}$, symbolically illustrates this phenomenon. The socket resistance variation occurs due to the degradation of the socket 30 over its lifetime as well as manufacturing tolerances. In one example, the socket resistance varies by about 4:1 over the socket lifetime, meaning the socket resistance at the end of the socket lifetime is four times the socket resistance when the part is new. The change in socket resistance impairs the ability of the voltage regulator 40 to correctly ascertain, and thus control, the die voltage, $V_{die}$, where socket sensing is used.

The block diagram of FIG. 3 depicts an alternative approach employed by the system 100 of FIG. 1. As in FIG. 2, the voltage regulator 40 receives a voltage, $V_{ps}$, from the power supply 12 and supplies a voltage, $V_{vr}$, to the microprocessor 60. This time, however, the feedback mechanism of the voltage regulator 40 is changed, such that the die voltage, $V_{die}$, is supplied to the feedback input of the voltage regulator 40 instead of the socket voltage, $V_{skt}$.

By directly monitoring the die voltage, $V_{die}$, the voltage regulator 40 can avoid the derivation operations inherent in the socket-sensing scheme of FIG. 2. Furthermore, the expected variation in the socket resistance is no longer a consideration, since the die voltage, $V_{die}$, is not derived, but is directly received back into the voltage regulator 40.

The implementation of die sensing is straightforward. The layout of the motherboard 50 can be modified to connect a feedback input pin on the voltage regulator IC to the appropriate socket receiving holes 32 with the die voltage, $V_{die}$. The microprocessor 60 already has one or more pins 22 which directly provide the die voltage, $V_{die}$. The die voltage is frequently accessed when testing the microprocessor 60, such as during validation.

One benefit of the system 100 is the strength of the voltage transient during die sensing. Recall that, when the load current changes, a voltage transient, or sudden change in the load voltage, is observed. A voltage transient caused by a drop in the current may occur in the system 100, for example, when the microprocessor 60 changes from an idle state to an active state. The voltage regulator 40 ensures that, to the extent possible, the output voltage, $V_{vr}$, is not significantly affected by the voltage transient, although a temporary drop in voltage may occur.

Figure 4:
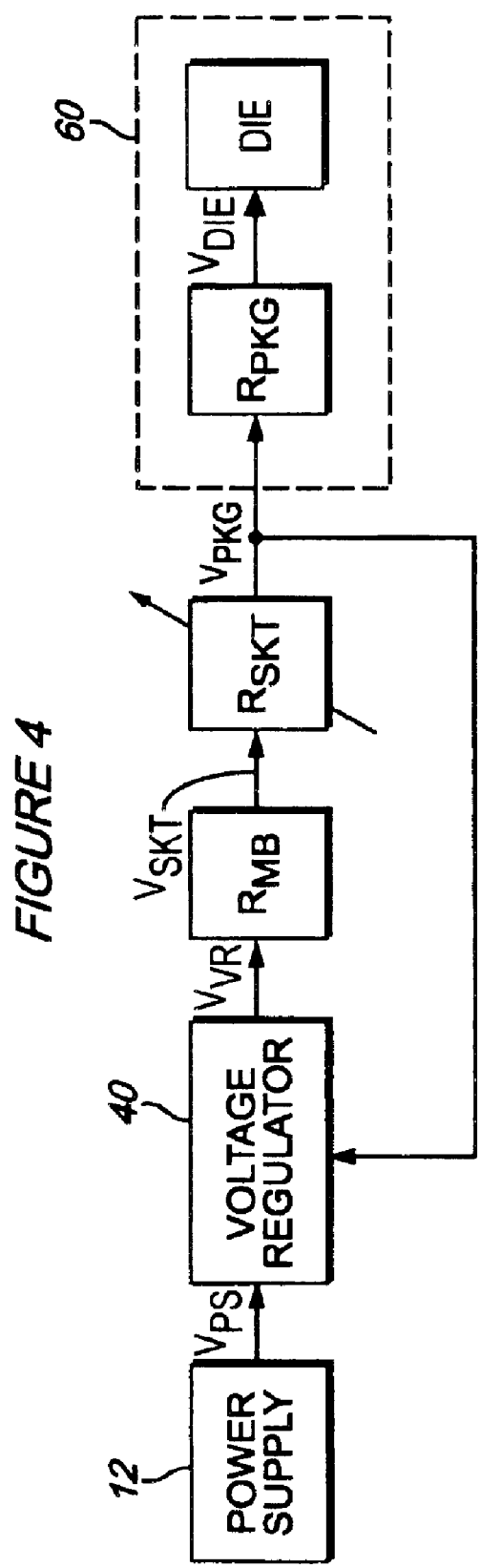
FIG. 4 is a block diagram of a voltage regulator that performs package sensing according to some embodiments of the invention.

As an alternative to die sensing, the system 100 may employ package sensing, as illustrated in FIG. 4. As in FIGS. 2 and 3, the voltage regulator 40 receives a voltage, $V_{ps}$, from the power supply 12 and supplies a voltage, $V_{vr}$, to the microprocessor 60. The package voltage, $V_{pkg}$, rather than the die voltage, $V_{die}$, or the socket voltage, $V_{skt}$, is supplied to the feedback input of the voltage regulator 40. As in the die sensing of FIG. 3, the variation in the socket resistance does not affect the package voltage, $V_{pkg}$.

Figure 5A:
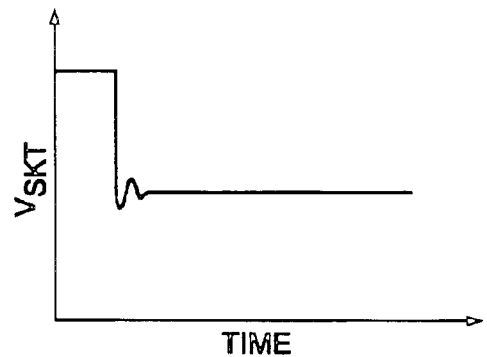
FIGS. 5A and 5B are graphs depicting voltage transients at the socket and at the die, respectively, of a microprocessor according to some embodiments of the invention.
Figure 5B:
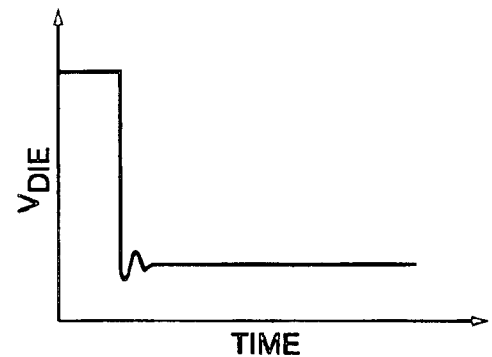

As illustrated in the graphs of FIGS. 5A and 5B, the die voltage, $V_{die}$, produces a larger (stronger) voltage transient (FIG. 4B) than the socket voltage, $V_{skt}$ (FIG. 4A). The package voltage, $V_{pkg}$, also produces a larger voltage transient than the socket voltage, $V_{skt}$. Because of the larger error signal, the voltage regulator 40 is able to respond more quickly than with socket sensing. Put another way, the larger error signal produced during die or package sensing reduces the response time of the voltage regulator 40.

The result is a smaller voltage droop during a voltage transient in the system 100 relative to prior art socket-sensing schemes. Other methods of increasing the response time of the voltage regulator include increasing the switching frequency of the voltage regulator or increasing the percentage bandwidth of the feedback loop. Increasing the switching frequency adds cost to the voltage regulator (both in terms of increased power loss and added circuitry). Increasing the percentage bandwidth of the feedback loop may actually render the voltage regulator unstable and inaccurate.

The die (or package) sensing scheme of the system 100 is, by contrast, an effective method for reducing the voltage regulator response time. In some embodiments, the voltage regulator shows a ten percent improvement in response time using die sensing, although factors, such as the type and number of decoupling capacitors used on the motherboard 50, can affect the measured result.

Figure 6:
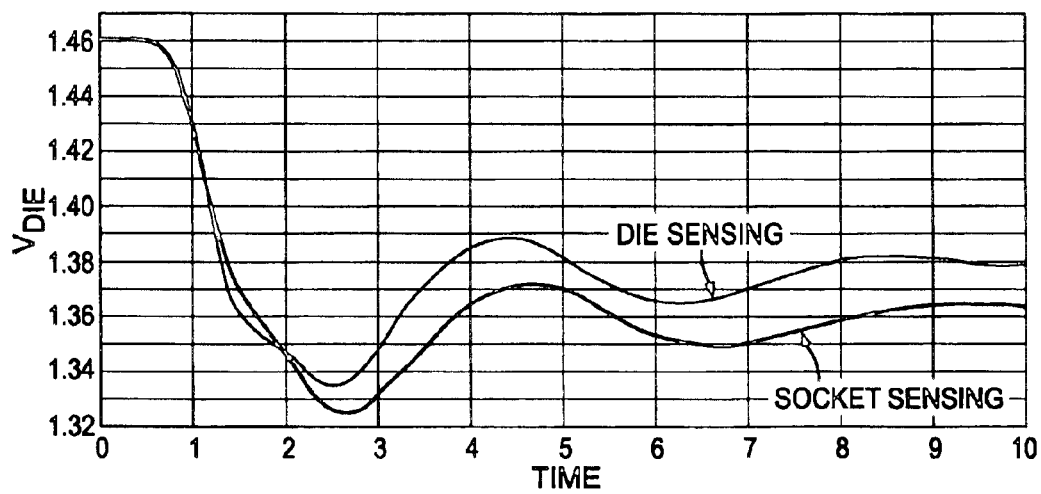
FIG. 6 is a graph comparing the die voltage over time using die sensing and socket sensing according to some embodiments of the invention.

In FIG. 6, a graph depicts the measured die voltage, $V_{die}$, waveforms, on a voltage regulator test board, one graph showing $V_{die}$ using socket sensing, $V_{die}$[socket sensing], and the other graph showing $V_{die}$ using die sensing, $V_{die}$[die sensing]. The substantial drop in voltage indicates a voltage transient, due to a sudden change in the load current. Because the response time is reduced with die sensing, the die voltage, $V_{die}$[die sensing] recovery is better, as compared to the die voltage, $V_{die}$[socket sensing]. An improvement in response time is also expected with package sensing, as compared to socket sensing.

The voltage supplied to the die by the voltage regulator has a range, $V_{range}$. For socket-sensing voltage regulators, the range, $V_{range}$, is made up of the amplitude of the droop during a transient, the variation in the die voltage due to the change in socket resistance, and the tolerances of the voltage regulator. $V_{range}$ is made up of voltages between a minimum voltage, $V_{min}$, and a maximum voltage, $V_{max}$.

The upper voltage, $V_{max}$, is determined by the microprocessor, that is, the maximum amount of voltage the silicon can withstand. Based on the maximum current drawn, $I_{max}$, the maximum power loss, $P_{max}$, expected from the microprocessor can be determined, according to the formula:

$$P_{max} = V_{max} \times I_{max} \quad (1)$$

The lower voltage, $V_{min}$, is then derived using the following formula:

$$V_{min} = V_{max} - V_{range} \quad (2)$$

$V_{range}$, $V_{max}$ and $V_{min}$ vary as a function of the load current, due to the loadline and other factors. The values used in equation (1) and (2) are for $I_{max}$.

The minimum voltage, $V_{min}$, determines the performance of the microprocessor, i.e., at which frequency the microprocessor can be operated. A higher voltage is associated with a higher performing microprocessor.

Each microprocessor supplies a voltage identifier, VID, to the voltage regulator. The VID indicates the appropriate range location for the processor. Thus, for example, for a system with a 100 mV $V_{range}$ at $I_{max}$, the VID determines the location of $V_{range}$, so that $V_{max}$ is at 1V and $V_{min}$ is at 900 mV. Changing the VID can move the range up or down, such as moving $V_{max}$ up to 1.1V and $V_{min}$ up to 1V.

The VID feature allows multiple microprocessors to be supported on a single system, without requiring that the voltage regulator be switched out when the microprocessor is changed. Because of the reduced power loss, it is advantageous to reduce $V_{range}$, when possible, for a given microprocessor.

The die (or package) sensing of the system 100 reduces $V_{range}$ by decreasing the voltage droop amplitude and removing the variation associated with the changing socket resistance over time. A reduction in the droop voltage amplitude moves the $V_{min}$ value up for the same microprocessor VID. Further, the removal of the socket resistance variation from consideration moves the $V_{max}$ down for the same microprocessor VID.

A lowered maximum voltage, $V_{max}$, results in a lowered power loss for a given microprocessor VID, according to formula (1) above. Advantages may include using a lower operating temperature and/or associating a smaller heat sink with the microprocessor. Alternatively, the reduction in $V_{max}$ due to the use of die or package sensing could improve the processor reliability to a point where the VID can be increased while maintaining reliability requirements. This will reduce the $P_{max}$ benefit, but the increase in $V_{min}$ will result in improved microprocessor performance. Thus, by using either package-sensing (FIG. 4) or die-sensing (FIG. 3), the system 100 can support either a higher-performing microprocessor (higher VID) or can scale down the thermal solution of the system due to the microprocessor operating at a reduced voltage range, $V_{range}$, relative to socket-sensing schemes.

Voltage-regulated systems, such as the system 100, typically employ one or more decoupling capacitors along the motherboard 50. These decoupling capacitors essentially store charge, to help maintain a voltage during switching operations of the voltage regulator. Instead of increasing the performance of the microprocessor 60, the number of decoupling capacitors can be decreased, for a cost savings, while maintaining the original performance of the system. The system 100 thus affords a more cost-effective solution, relative to socket-sensing systems.

While the invention has been described with respect to a limited number of embodiments, those skilled in the art will appreciate numerous modifications and variations therefrom. It is intended that the appended claims cover all such modifications and variations as fall within the true spirit and scope of the invention.

I claim:

1. A system, comprising:
   a microprocessor;
   a voltage regulator for supplying a first voltage along a power delivery path to the microprocessor, the power delivery path being characterized by a variable resistance; and
   a feedback path coupled between the power delivery path and the voltage regulator, wherein the feedback path enables the voltage regulator to sense a second voltage; wherein the second voltage is converted from the first voltage by the variable resistance of the power delivery path before being received into the microprocessor.

2. The system of claim 1, further comprising:
   a socket located along the power delivery path, wherein the socket produces the variable resistance.

3. The system of claim 1, wherein the microprocessor further comprises a comprises a die and the feedback path is coupled between the die and the voltage regulator.

4. The system of claim 1, wherein the microprocessor further comprises a die and a package, wherein the feedback path is coupled between the package and the voltage regulator.

5. A method, comprising:
   supplying a voltage to a microprocessor by a voltage regulator, the microprocessor comprising a die and a package, the microprocessor being coupled to the voltage regulator along a first path characterized by a variable resistance;
   monitoring a second voltage, the second voltage being received into the voltage regulator along a second path, wherein the second voltage is converted from the first voltage by the variable resistance;
   identifying a transient in the second voltage; and
   supplying a new voltage to the microprocessor.

6. The method of claim 5, monitoring the second voltage further comprising monitoring a voltage at the die of the microprocessor.

7. The method of claim 5, monitoring the second voltage further comprising monitoring a voltage at the package of the microprocessor.

* * * * *